United States Patent
Jo et al.

(10) Patent No.: US 9,247,403 B2
(45) Date of Patent: Jan. 26, 2016

(54) METHOD AND APPARATUS FOR FILTERING A MOBILE HIGH-DEFINITION LINK SIGNAL

(71) Applicant: Samsung Electronics Co., Ltd., Gyeonggi-do (KR)

(72) Inventors: Young-Sun Jo, Gyeonggi-do (KR); Jeong-Hoo Kim, Gyeongsangnam-do (KR); Ki-Yeon Park, Gyeonggi-do (KR); Seo-Young Park, Seoul (KR); Eun-Seok Hong, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 213 days.

(21) Appl. No.: 14/024,784

(22) Filed: Sep. 12, 2013

(65) Prior Publication Data
US 2014/0073309 A1  Mar. 13, 2014

(30) Foreign Application Priority Data

Sep. 13, 2012  (KR) .................. 10-2012-0101588

(51) Int. Cl.
*H04M 3/00* (2006.01)
*H04W 4/20* (2009.01)
*H04W 4/16* (2009.01)

(52) U.S. Cl.
CPC . *H04W 4/20* (2013.01); *H04W 4/16* (2013.01)

(58) Field of Classification Search
CPC .................................. H04W 4/16; H04W 4/20
USPC ........................................... 455/418; 370/338
See application file for complete search history.

(56) References Cited

U.S. PATENT DOCUMENTS

2009/0248924 A1* 10/2009 Melin ................... G09G 5/006
 710/63
2011/0285916 A1* 11/2011 Takiduka ............... G09G 5/006
 348/723

* cited by examiner

*Primary Examiner* — Marcos Batista
(74) *Attorney, Agent, or Firm* — Cha & Reiter, LLC

(57) ABSTRACT

A method and an apparatus perform Mobile High-definition Link (MHL) signal filtering. The method of performing the Mobile High-definition Link (MHL) signal filtering in a terminal includes determining whether a transmission device for MHL signal transmission is connected; determining whether a call continues when the transmission device is connected; and determining whether to perform the MHL signal filtering in the terminal based on whether the call continues. Accordingly, there is an advantage of improving picture quality of an image output from a multimedia device by effectively removing a common mode noise even when an RF weak electric field is formed due to call generation.

6 Claims, 13 Drawing Sheets

| TEST ENVIRONMENT | CM FILTER IS NOT APPLIED TO TRANSMISSION DEVICE | CM FILTER IS APPLIED TO TRANSMISSION DEVICE | | | |
|---|---|---|---|---|---|
| | | CM IMPEDANCE=12 ohm | CM IMPEDANCE=35 ohm | CM IMPEDANCE=50 ohm | CM IMPEDANCE=90 ohm |
| PCS 1900 ELECTRIC FIELD AREA RANGING FROM -65 DBM TO -70 DBM | NOT OK | OK | OK | OK | OK |
| GSM 900, 38ch TEM cell | NOT OK (5~7 PCL) | NOT OK (5~7 PCL) | NOT OK (5~7 PCL) | OK | OK |
| DCS 1800, 650ch TEM cell | NOT OK (0~3 PCL) | NOT OK (0~2 PCL) | OK | OK | OK |
| PCS 1900, 698ch TEM cell | NOT OK (0~3 PCL) | NOT OK (0~1 PCL) | OK | OK | OK |

FIG.10

METHOD AND APPARATUS FOR FILTERING A MOBILE HIGH-DEFINITION LINK SIGNAL

CLAIM OF PRIORITY

This application claims, pursuant to 35 U.S.C. §119(a), priority to and the benefit of the earlier filing date of Korean Application Serial No. 10-2012-0101588, which was filed in the Korean Intellectual Property Office on Sep. 13, 2012, the entire contents of which are hereby incorporated by reference.

BACKGROUND

1. Field of the Invention

The present invention relates generally to a method and an apparatus for filtering a signal, and more particularly, to a method and an apparatus for filtering a Mobile High-definition Link (MHL) signal.

2. Description of the Related Art

In the prior art, due to development of multimedia technology and communication technology, a terminal such as a smart phone or the like can transmit media to a relatively large size multimedia device such as a monitor, a television or the like. Accordingly, a user transmits media stored in the terminal to the relatively large size multimedia device in real time, and thus enjoys the media with the relatively large size multimedia device.

For high quality transmission of the media, a Mobile High-definition Link (MHL) technique has been developed. The MHL technique is a technique enabling compatibility between a micro Universal Serial Bus (USB) and a High Definition Multimedia Interface (HDMI).

As illustrated in FIGS. 1A-1D, the MHL technique can simultaneously transmit a common mode clock (CLK) component of 7.5 MHz and a differential mode data component of 2.2 Gbps by using a pair of differential signals. Accordingly, based on the MHL technique, the number of signals for media transmission is reduced, which corresponds to a greater advantage in allocating pins of a connector.

FIGS. 1A to 1D illustrate examples for describing the MHL technique in the prior art. FIG. 1A illustrates an example of a signal transmission circuit according to the MHL technique, FIG. 1B illustrates an example of an MHL signal according to the MHL technique, FIG. 1C illustrates an example of a common mode clock component included in the MHL signal, and FIG. 1D illustrates an example of a differential mode data component included in the MHL signal.

Since the MHL technique transmits a differential mode data component and a common mode clock component by using a pair of differential signals (hereinafter, referred to as an "MHL signal"), the common mode clock component is distorted when common mode noise flows in, and accordingly, an entire MHL signal is distorted. In particular, shaking of an output screen may be generated or the output screen may be turned off under an RF weak electric field.

In order to solve the above problems, a method of reinforcing shielding of a transmission device (for example, a dongle) is used for transmitting the MHL signal, but the method cannot achieve perfect blocking of the common mode noise.

Meanwhile, in order to satisfy a Radiated Emission (RE) standard, a common mode filter for blocking the common mode noise is applied to a terminal transmitting the MHL signal. However, even in this case, since an RF transmission signal generated in the terminal passes through the common mode filter employed in the terminal and then flows in the common mode clock, the common mode clock component will be distorted. It is because, while the common mode clock component is a signal switched to 400 mV, the RF transmission signal forming the RF weak electric field is a signal corresponding to a maximum of 10 V (33 dBm). Accordingly, even though some RF transmission signal flows in, the common mode clock component will be distorted, thereby resulting in distorting of the entire MHL signal.

SUMMARY

Accordingly, the present invention provides a method capable of effectively filtering an MHL signal.

Other objects desired to be provided in the present invention will be grasped through the following exemplary embodiments.

In accordance with an aspect of the present invention, a method of performing Mobile High-definition Link (MHL) signal filtering in a terminal is provided. The method including determining whether a transmission device for MHL signal transmission is connected; determining whether a call continues when the transmission device is connected; and determining whether to perform the MHL signal filtering in the terminal based on whether the call continues.

In accordance with another aspect of the present invention, a method of performing Mobile High-definition Link (MHL) signal filtering by a transmission device for MHL signal transmission is provided. The method includes receiving the MHL signal from a terminal; calculating a noise value included in the received MHL signal; and determining whether to perform the MHL signal filtering based on the calculated noise value.

In accordance with another aspect of the present invention, a method of performing Mobile High-definition Link (MHL) signal filtering by a transmission device for MHL signal transmission is provided. The method includes receiving a control signal for instructing whether to perform an MHL signal filtering from a terminal; and determining whether to perform the MHL signal filtering based on the received control signal.

In accordance with another aspect of the present invention an apparatus for performing Mobile High-definition Link (MHL) signal filtering in a terminal is provided. The apparatus includes a connection port connectable with a transmission device for MHL signal transmission; and a controller for determining whether a call continues when the transmission device is connected and performing the MHL signal filtering in the terminal based on whether call continues.

In accordance with another aspect of the present invention, an apparatus for performing Mobile High-definition Link (MHL) signal filtering in a transmission device for MHL signal transmission is provided. The apparatus includes a connection port for receiving an MHL signal, the connection port being connected to a terminal; a controller for calculating a noise value included in the received MHL signal and determining whether to perform the MHL signal filtering based on the calculated noise value; and a filter unit for performing the MHL signal filtering under a control of the controller.

In accordance with another aspect of the present invention, an apparatus for performing Mobile High-definition Link (MHL) signal filtering in a transmission device for MHL signal transmission is provided. The apparatus includes a connection port for receiving an MHL signal and a control signal for instructing whether to perform the MHL signal filtering, the connection port being connected to a terminal; a controller for determining whether to perform the MHL signal filtering based on the received control signal; and a filter unit for performing the MHL signal filtering under a control of the controller.

According to the present invention, there is an advantage of improving a picture quality of an image output from a multimedia device by effectively removing common mode noise even when an RF weak electric field due to call generation is formed.

BRIEF DESCRIPTION OF THE DRAWINGS

The above and other features and advantages of the present invention will become more apparent by describing in detail exemplary embodiments thereof with reference to the attached drawings in which:

FIG. 10 illustrates an MHL signal filtering effect in a state where a common mode filter is applied to the transmission device according to the exemplary embodiments of the present invention.

DETAILED DESCRIPTION

Figure 1A:
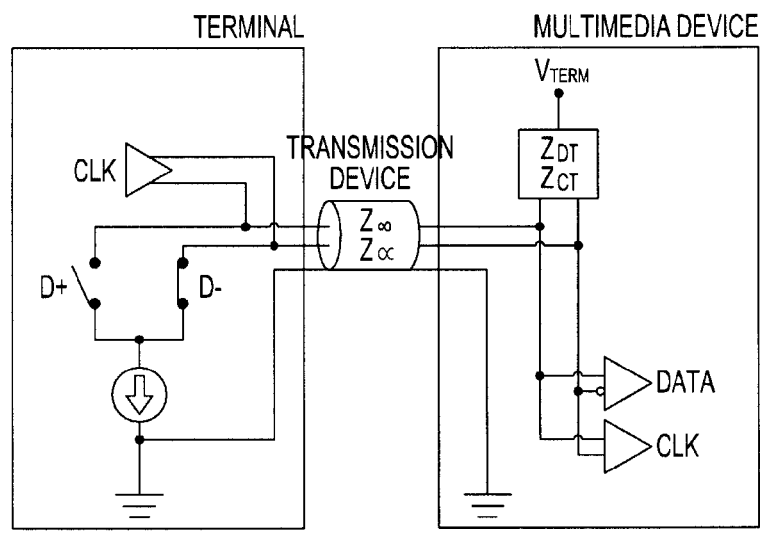
FIGS. 1A, 1B, 1C, and 1D illustrate examples in the prior art for describing an MHL technique.
Figure 1B:
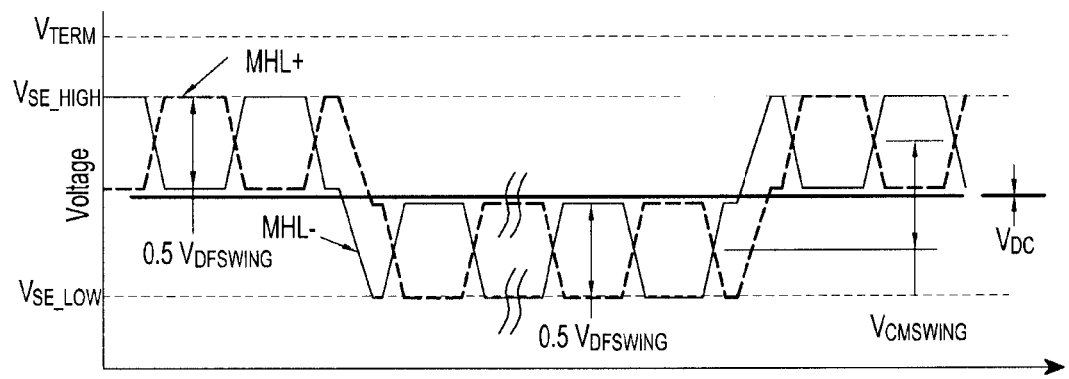
Figure 1C:
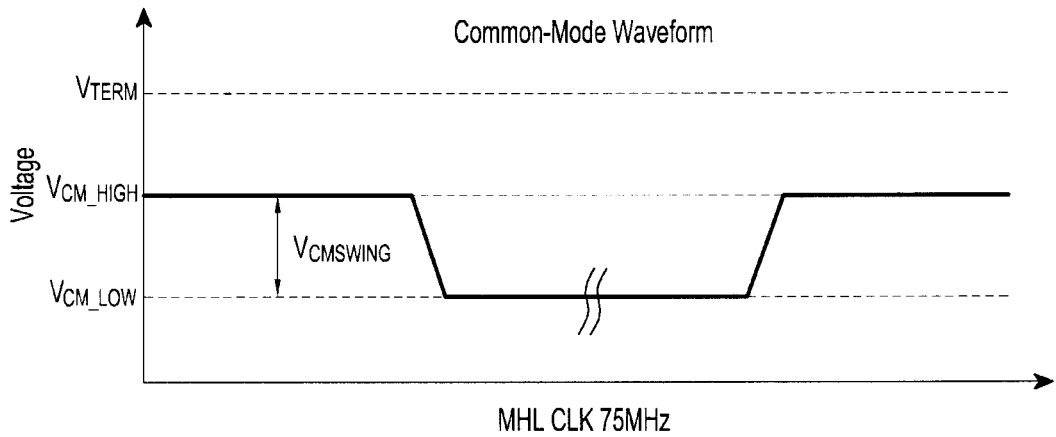
Figure 1D:
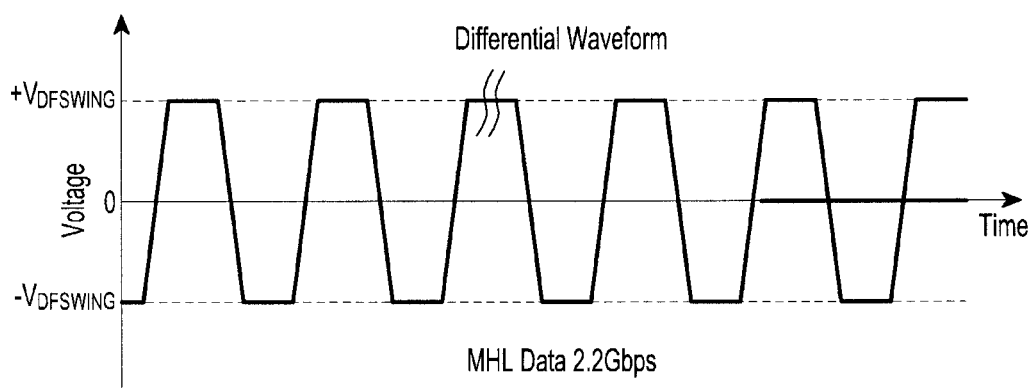

Exemplary embodiments of the present invention will be described with reference to the accompanying drawings. In the following description, a detailed explanation of known related functions and constructions may be omitted to avoid unnecessarily obscuring the subject matter of the present invention. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

As described above, the MHL signal filtering method in the prior art cannot effectively block a distortion of the common mode clock component. In particular, a signal distortion under an RF weak electric field causes a serious distortion of an output screen.

Accordingly, the present invention provides a method of blocking a distortion of the common mode clock component of the MHL signal. Specifically, the present invention provides a method of filtering the MHL signal by simultaneously applying a filtering apparatus for filtering the MHL signal to both a media device and a transmission device such as a dongle or the like.

Meanwhile, as described above, a filter for filtering common mode noise is applied to a terminal in the prior art in order to satisfy an RE standard. At this time, filtering the MHL signal in the transmission device such as the dongle or the like other than the media device is contrary to an MHL specification. Accordingly, a method of satisfying both the RE standard and the MHL specification is required.

In the RE standard, whether to satisfy a reference is an issue when in a state where a call is not connected, and an MHL signal distortion issue is generated in a state where the call is connected. Accordingly, the exemplary embodiments of the present invention provide the method of satisfying both the RE standard and the MHL specification separately in the state where the call is connected and the state where the call is not connected.

That is, the present invention provides the method in which the terminal filters the MHL signal in the state where the call is not connected and the transmission device such as the dongle or the like filters the MHL signal in the state where the call is connected.

According to the present invention, there are advantages of satisfying both the RE standard and the MHL specification and effectively removing the common mode noise.

Hereinafter, in a description of the exemplary embodiments of the present invention, a device such as the dongle or the like, which receives the MHL signal from the terminal, converts the received MHL signal to an HDMI signal and then transmits the HDMI signal to a multimedia device, is referred to as the transmission device.

Hereinafter, the exemplary embodiments of the present invention will be described with reference to the accompanying drawings.

Figure 2A:
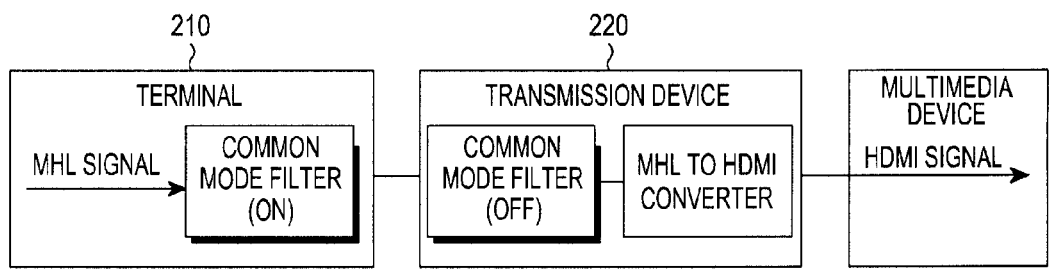
FIGS. 2A and 2B are block diagrams for describing an MHL signal filtering apparatus according to exemplary embodiments of the present invention.
Figure 2B:
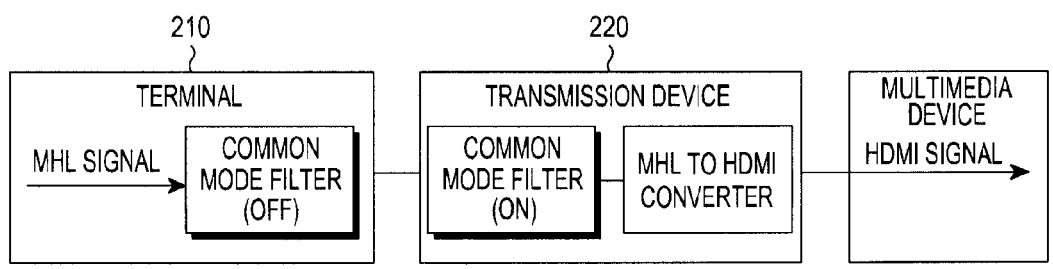

First, an MHL signal filtering apparatus according to the exemplary embodiments of the present invention will be described with reference to FIGS. 2A and 2B. FIGS. 2A and 2B are block diagrams for describing the MHL signal filtering apparatus according to the exemplary embodiments of the present invention.

As described above, in the exemplary embodiments of the present invention, each of a terminal 210 and a transmission device 220 have a common mode filter which uses known methods for filtering common mode noise from signals. Further, according to whether an RF weak electric field is formed, the terminal 210 or the transmission device 220 performs MHL signal filtering. The two cases are separately described.

Referring first to FIG. 2A, FIG. 2A illustrates the case where the RF weak electric field is not formed. That is, in the state where the call is not generated, the terminal 210 turns on the common mode filter for filtering the MHL signal, and the transmission device 220 turns off the common mode filter for filtering the MHL signal.

As described above, the MHL signal filtering in both the terminal 210 and the transmission device 220 is contrary to the MHL specification. However, as illustrated in FIG. 2A, the MHL specification is satisfied when the terminal 210 performs the MHL filtering and the transmission device 220 does not perform the MHL signal filtering in the state where the call is not generated. Further, in this case, the RE standard is satisfied.

Meanwhile, referring to FIG. 2B, FIG. 2B illustrates the case where the RF weak electric field is formed. That is, in the state where the call is generated, the terminal 210 turns off the common mode filter for filtering the MHL signal, and the transmission device 220 turns on the common mode filter for filtering the MHL signal.

As illustrated in FIG. 2B, when the terminal does not perform the MHL signal filtering and the transmission device 220 performs the MHL signal filtering in the state where the call is generated, there are advantages in that the MHL specification is satisfied and a signal distortion due to the RF weak electric field is reduced.

In the above description, the MHL signal filtering apparatus according to the exemplary embodiments of the present invention has been discussed with reference to FIGS. 2A-2B. Hereinafter, an MHL signal filtering apparatus according to the exemplary embodiment of the present invention will be described with reference to FIG. 3.

Figure 3:
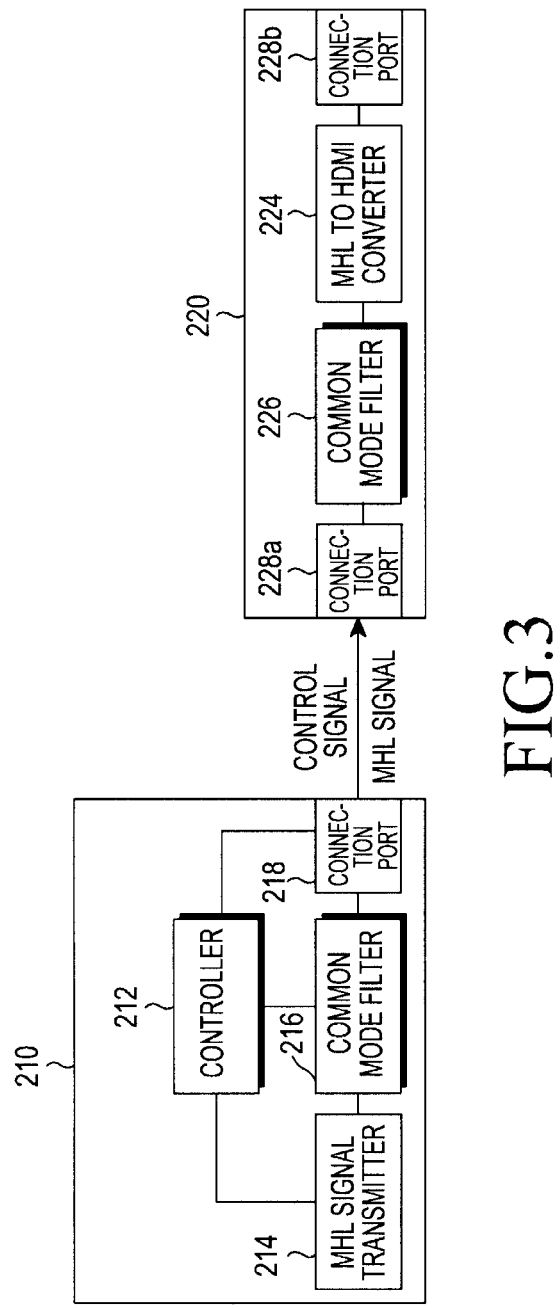
FIG. 3 is a block diagram for describing the MHL signal filtering apparatus of FIGS. 2A-2B in greater detail according to the exemplary embodiment of the present invention.

FIG. 3 is a block diagram for describing the MHL signal filtering apparatus of FIGS. 2A-2B in greater detail according to the exemplary embodiment of the present invention. FIG. 3 illustrates the terminal 210 for transmitting the MHL signal and the transmission device 220 for receiving the MHL signal from the terminal 210, converting the MHL signal to a HDMI signal, and then transmitting the HDMI signal to a multimedia device, as shown in FIGS. 2A-2B.

First, a configuration of the terminal 210 will be described. Referring to FIG. 3, the terminal 210 according to the exemplary embodiment of the present invention includes a controller 212, an MHL signal transmitter 214, a common mode filter 216, and a connection port 218.

The controller 212 determines whether the transmission device 220 is connected. That is, when a set signal is received from the transmission device 220 through the connection port 218, it is recognized that the transmission device 220 is connected.

Further, the controller 212 controls the MHL signal transmitter 214 such that media selected by a user is converted to the MHL signal and then the MHL signal is output.

In addition, the controller 212 controls an on/off state of the common mode filter 216. At this time, the controller 212 controls the on/off state of the common mode filter 216 by determining whether the RF weak electric field is formed on the terminal 210. In the exemplary embodiment, the fact of whether the RF weak electric field is formed may be determined by whether the call is generated. For example, it is determined that the RF weak electric field is formed when the call is generated, and it is determined that the RF weak electric field is not formed when the call is terminated. To this end, the controller 212 may receive a signal for determining whether the call is generated or terminated from a transceiver connected to or included in the controller 212 for transmitting and receiving an RF signal. Accordingly, the controller 212 turns on the common mode filter 216 located in the terminal 210 when it is determined that the call is not generated in the terminal 210, and turns off the common mode filter 216 located in the terminal 210 when it is determined that the call is generated. Further, when it is determined that the call is generated, the controller 212 generates a control signal and transmits the control signal to the transmission device 220 so that the common mode filter 226 located in the transmission device 220 is turned on. In addition, after the call is generated in the terminal 210, it is determined whether the call is terminated. When it is determined that the call is terminated, the controller 212 turns on the common mode filter 216 located in the terminal 210, and generates a control signal for instructing to turn off the common mode filter 226 located in the transmission device 220 and transmits the control signal to the transmission device 220.

In the exemplary embodiment, the control signal for instructing to turn on or turn off the common mode filter of the transmission device 220 may be transmitted using an NC pin.

Referring back to FIG. 3, the MHL signal transmitter 214 converts media selected by the user to the MHL signal and transmits the MHL signal to the common mode filter 216 under a control of the controller 212.

The common mode filter 216 in an on state filters the MHL signal received from the MHL signal transmitter 214. That is, the common mode filter 216 performs filtering for removing a common mode noise component. The on/off state of the common mode filter 216 is controlled by the controller 212.

The connection port 218 is connected to a connection port 228a of the transmission device 220 and is used for transmitting a signal for recognition of the connection between the terminal 210 and the transmission device 220, the MHL signal, and the control signal.

Hereinafter, a configuration of the transmission device 220 will be described. Referring to FIG. 3, the transmission device 220 according to the exemplary embodiment of the present invention includes connection ports 228a and 228b, the common mode filter 226, and an MHL to HDMI converter 224.

The connection port 218a is connected to the connection port 218 of the terminal 210 and used for transmitting the signal indicating recognition of the connection between the terminal 210 and the transmission device 220, the MHL signal, and the control signal.

The common mode filter 226 in an on state filters the MHL signal received from the terminal 210. That is, the common mode filter 226 performs filtering for removing the common mode noise component. The on/off state of the common mode filter 226 is controlled by the control signal received from the terminal 210. That is, the common mode filter 226 is turned on when the control signal for instructing to turn on the common mode filter 226 is received from the terminal 210, and the common mode filter 226 is turned off when the control signal for instructing to turn off the common mode filter 226 is received from the terminal 210. To this end, the common mode filter 226 may include a switch therein for changing the on/off state of the common mode filter 226 according to the control signal received from the terminal 210. Alternatively, a switch located may be included in a front end or a rear end of the common mode filter 226 to change the on/off state of the common mode filter 226 according to the control signal received from the terminal 210.

The MHL to HDMI converter 224 converts the MHL signal received from the common mode filter 226 to the HDMI signal and outputs the HDMI signal to the connection port 228b.

The connection port 228b may be connected to a multimedia device for an HDMI image output and used for transmitting the HDMI signal received from the MHL to HDMI converter 224 to the multimedia device.

In the above description, the MHL signal filtering apparatus according to the exemplary embodiment of the present invention has been discussed with reference to FIG. 3. Meanwhile, as described with reference to FIG. 3, the terminal 210 may control the on/off state of the common mode filter 226 located in the transmission device 220, but the transmission device 220 may directly control the on/off control of its own common mode filter 226 according to alternative exemplary embodiments. The exemplary embodiments will be described below with reference to associated drawings.

Figure 4:
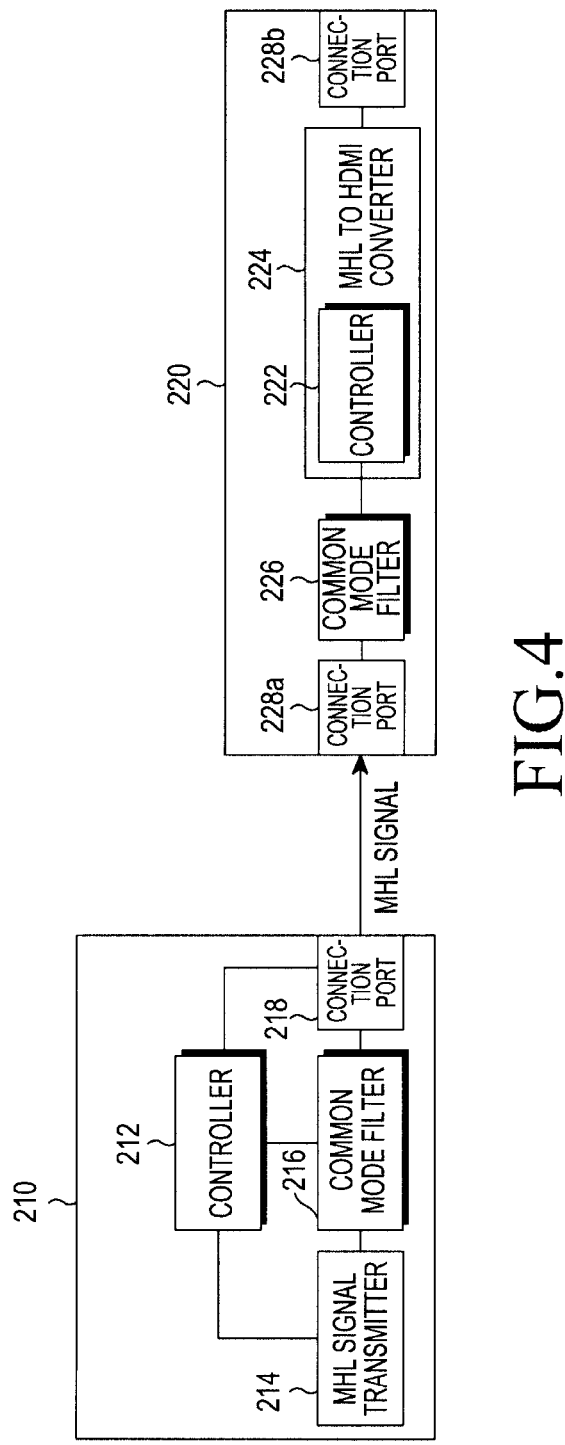
FIGS. 4 and 5 are block diagrams for describing an MHL signal filtering apparatus according to an alternative exemplary embodiment of the present invention.

FIG. 4 is a block diagram for describing an MHL signal filtering apparatus according to an alternative exemplary embodiment of the present invention. In the alternative exemplary embodiment described with reference to FIG. 4, a description of the same components as those of FIG. 3 will be omitted as necessary.

First, the configuration of the terminal 210 will be described. Referring to FIG. 4, the terminal 210 according to the alternative exemplary embodiment of the present invention includes the controller 212, the MHL signal transmitter 214, the common mode filter 216, and the connection port 218.

Operations of the terminal 210 in the alternative exemplary embodiment of FIG. 4 are the same as those described with reference to FIG. 3 except that the controller 212 does not generate the control signal for controlling the common mode filter 226 located in the transmission device 220 and so the control signal is not transmitted. Accordingly, a detailed description of the terminal 210 is herein omitted.

Hereinafter, the configuration of the transmission device 220 will be described. Referring to FIG. 4, the transmission device according to the alternative embodiment of the present invention includes the connection ports 228a and 228b, the common mode filter 226, and the MHL to HDMI converter 224.

The alternative exemplary embodiment of FIG. 4 is different from the exemplary embodiment of FIG. 3 in that another controller 222 is formed within the MHL to HDMI converter 224 in FIG. 4. Unlike the exemplary embodiment described with reference to FIG. 3, in the alternative exemplary embodiment illustrated in FIG. 4, the transmission device 220 does not receive the control signal for controlling the on/off state of the common mode filter 226 from the terminal 210, but directly controls the on/off state of the common mode filter 226 using the controller 222. Since other operations of the alternative exemplary embodiment of FIG. 4 are the same as those described with reference to FIG. 3, detailed descriptions thereof will be herein omitted. Hereinafter, only a configuration of FIG. 4 where the transmission device 220 directly controls the on/off state of the common mode filter 226 will be described.

The transmission device 220 according to the alternative exemplary embodiment of the present invention includes the controller 222 formed within the MHL to HDMI converter 224 to control the on/off state of the common mode filter 226.

The controller 222 calculates a noise value included in the input MHL signal and determines whether to filter the MHL signal based on the calculated noise value. For example, it is determined to perform the MHL signal filtering when the calculated noise value is equal to or greater than a predetermined setting value, and it is determined not to perform the MHL signal filtering when the calculated noise value is less than the predetermined setting value. Further, the controller 222 controls the on/off state of the common mode filter 226 according to the determination. To this end, a switch for changing the on/off state of the common mode filter 226 may be included within the common mode filter 226 or between the common mode filter 226 and the controller 222.

The noise value included in the MHL signal may be calculated through various known methods. For example, the controller 222 may use a fast Fourier Transform (FFT) technique known in the art for calculating the noise value. That is, the received MHL signal is fast Fourier transformed, and a noise value of the fast Fourier transformed MHL signal may be calculated. Further, when a noise value of the fast Fourier transformed MHL signal in a particular bandwidth is equal to or greater than a predetermined setting value, it is determined to perform the MHL signal filtering and accordingly, the common mode filter 226 may be turned on. For example, when a noise value of the fast Fourier transformed MHL signal in a bandwidth of 1 GHz to 2 GHz is equal to or greater than the predetermined setting value, the controller 222 determines to perform the MHL signal filtering. Otherwise, the controller 222 may determine not to perform the MHL signal filtering.

Further, the controller 222 continuously measures the noise value of the MHL signal while the common mode filter 226 is in the on state, and identifies whether the measured noise value is less than the predetermined setting value. Such an operation may be performed every set period having a predetermined and repeated time duration. The noise value less than the predetermined setting value indicates that the call is terminated in the terminal 210. When the call is terminated in the terminal 210, the common mode filter 216 located in the terminal 210 is turned on and thus the controller 222 turns off the common mode filter 226 of the transmission device 220 as described above. Accordingly, the MHL specification is satisfied.

In the alternative exemplary embodiment described with reference to FIG. 4, since the control signal transmitted to the transmission device 220 from the terminal 210 to filter the MHL signal is not necessary, the processing to perform the signaling may be reduced or eliminated in comparison with the exemplary embodiment described with reference to FIG. 3.

Figure 5:
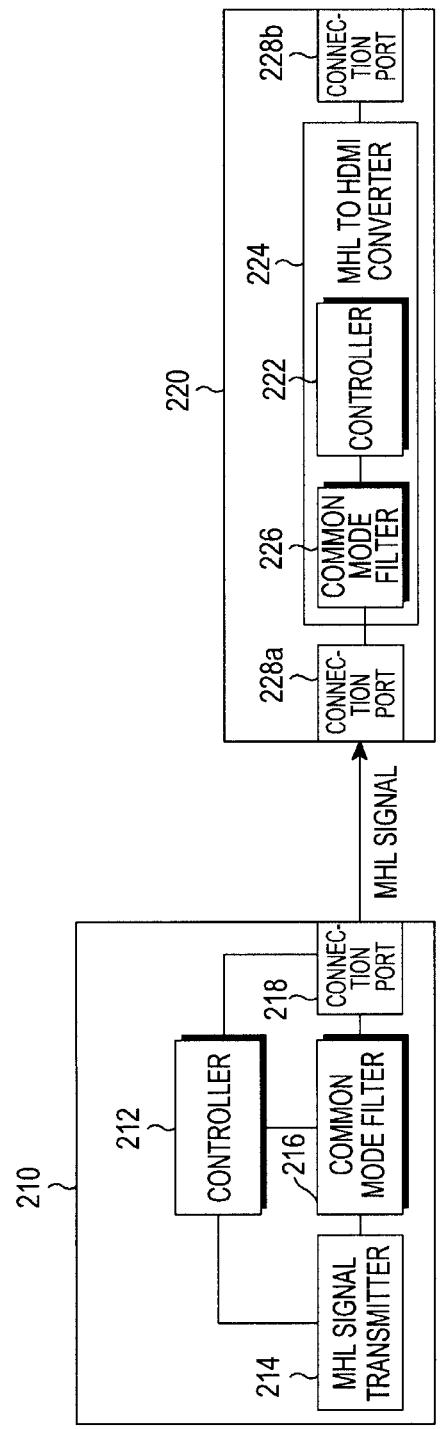

Meanwhile, in the alternative exemplary embodiment described with reference to FIG. 4, it has been described that the common mode filter 226 is located in the front end of the MHL to HDMI converter 224, but in another alternative embodiment shown in FIG. 5, the common mode filter 226 may be located within the MHL to HDMI converter 224. That is, the common mode filter 226 may be integrally formed with the MHL to HDMI converter 224, which will be described in FIG. 5. Since the operations of components illustrated in FIG. 5 are the same as those described with reference to FIG. 4, detailed descriptions thereof will be omitted.

In the above description, the MHL signal filtering apparatus according to exemplary embodiments of the present invention has been discussed with reference to FIGS. 3 to 5. Hereinafter, an MHL signal filtering process according to exemplary embodiments of the present invention will be described with reference to associated drawings.

Figure 6:
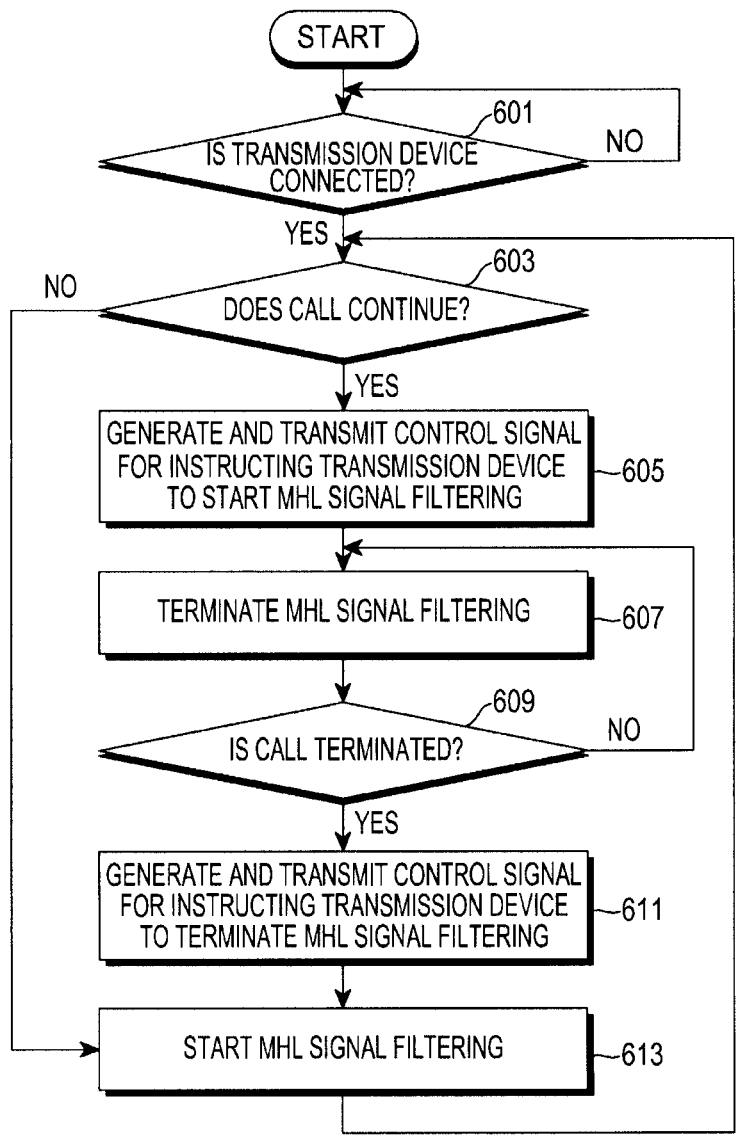
FIG. 6 is a flowchart for describing the MHL signal filtering process in a terminal according to the exemplary embodiment of the present invention.

FIG. 6 is a flowchart for describing an MHL signal filtering process according to the exemplary embodiment of the present invention. In FIG. 6, the flowchart is described based on operations performed in the terminal 210 shown in FIG. 3.

In step 601, the terminal 210 determines whether the transmission device 220 for transmitting the MHL signal is connected, and proceeds to step 603 when it is determined that the transmission device 220 is connected. Otherwise, the process loops back repeatedly to perform step 601 until the transmission device 220 is detected to be connected.

In step 603, the terminal 210 determines whether the call continues. At this time, the call continuity refers to a case where a generated existing call continues and a case where a new call is generated. When it is determined in step 603 that the call does not continue, the terminal 210 proceeds to step 613 to start the MHL signal filtering. However, when it is determined in step 603 that the call continues, the terminal 210 proceeds to step 605.

The terminal 210 generates the control signal for instructing to start the MHL signal filtering, and transmits the control signal to the transmission device 220 in step 605 performed as a result of the determination in step 603, which is a determination that the call continues. After step 605, the process then proceeds to step 607.

The terminal 210 terminates the MHL signal filtering in step 607, and then proceeds to step 609. That is, in step 607, the terminal terminates the MHL signal filtering when an existing MHL signal filtering is being performed, and maintains the state when the existing MHL signal filtering is not being performed.

The order of steps 605 and 607 may be switched or performed at the same time.

In step 609, the terminal 210 determines whether the call is terminated. The terminal 210 proceeds to step 611 when it is determined that the call is terminated, or proceeds to step 607 to maintain the MHL signal filtering stop state when it is determined in step 609 that the call is not terminated.

In step 611, the terminal 210 generates the control signal for instructing the transmission device 220 to terminate the MHL signal filtering, transmits the control signal to the transmission device 220, and then proceeds to step 613.

In step 613, the terminal 210 starts the MHL signal filtering, and loops back to step 603.

The order of steps 611 and 613 may be switched or performed at the same time.

In the above description, the MHL signal filtering operation performed in the terminal 210 according to the exemplary embodiment of the present invention has been discussed with reference to FIG. 6. Hereinafter, an MHL signal filtering operation performed in the transmission device 220 of FIG. 3 according to the exemplary embodiment of the present invention will be described with reference to FIG. 7.

Figure 7:
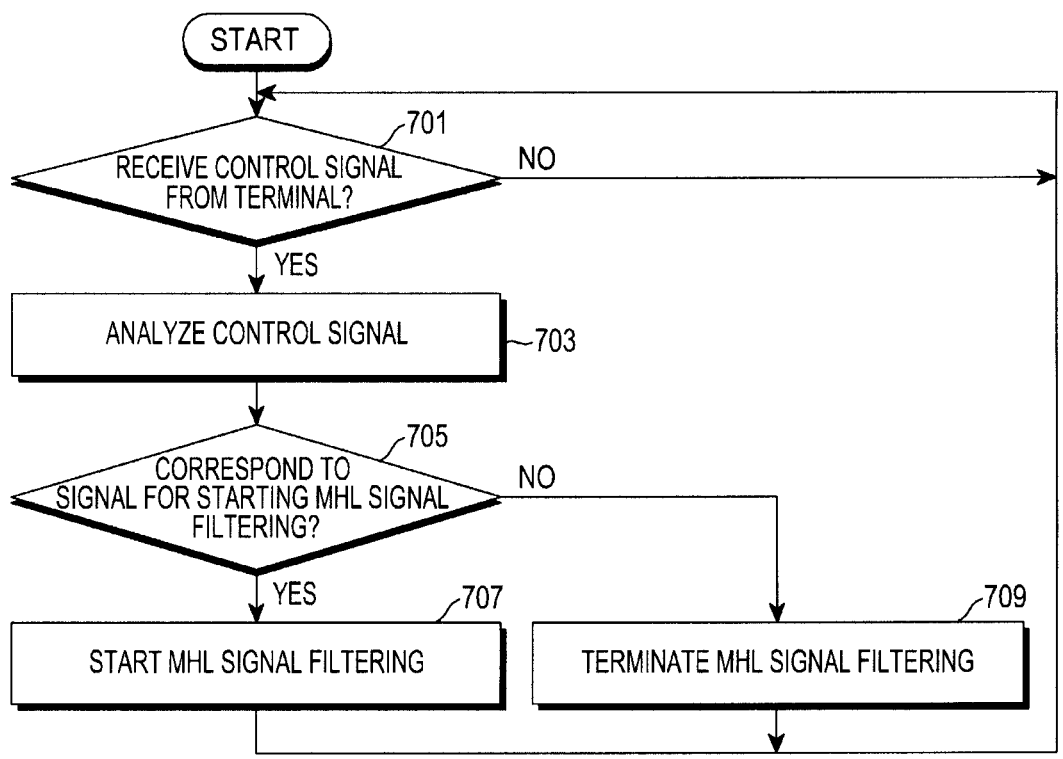
FIG. 7 is a flowchart for describing the MHL signal filtering process in a transmission device according to the exemplary embodiment of the present invention.

FIG. 7 is a flowchart for describing the MHL signal filtering operation performed in the transmission device 220 according to the exemplary embodiment of the present invention. The operations of the transmission device 220 illustrated in FIG. 7 are operations performed in accordance with the operations of the terminal 210 described with reference to FIG. 6.

In step 701, the transmission device 220 determines whether the control signal is received from the terminal 210, and proceeds to step 703 when it is determined that the control signal is received. Otherwise, the process loops back repeatedly to perform step 701 until a control signal is received.

In step 703, the transmission device 220 analyzes the received control signal, and then proceeds to step 705.

In step 705, the transmission device 220 determines whether the analyzed control signal is a signal for instructing to start or terminate the MHL signal filtering. As a result of the determination in step 705, when the analyzed control signal is the signal for instructing to start the MHL signal filtering, the transmission device 220 proceeds to step 707 to start the MHL signal filtering, and the process loops back to step 701.

Meanwhile, as a result of the determination in step 705, when the analyzed control is the signal for instructing to terminate the MHL signal filtering, the transmission device 220 proceeds to step 709 to terminate the MHL signal filtering, and the process loops back to step 701.

In the above description, the MHL signal filtering operations performed in the terminal 210 and the transmission device 220 according to the exemplary embodiment of the present invention have been discussed with reference to FIGS. 6 and 7. Hereinafter, an MHL signal filtering operation according to the alternative exemplary embodiment of the present invention will be described with reference to associated drawings.

Figure 8:
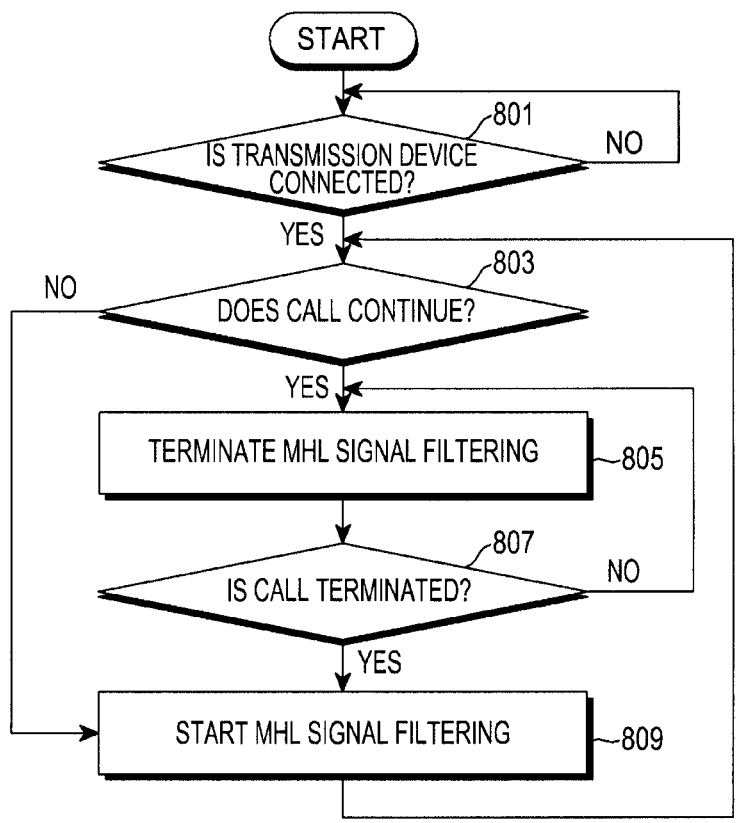
FIG. 8 is a flowchart for describing the MHL signal filtering process in a terminal according to the alternative exemplary embodiment of the present invention.

FIG. 8 is a flowchart for describing an MHL signal filtering process according to the alternative exemplary embodiment of the present invention. In FIG. 8, the flowchart is described based on the operations performed in the terminal 210 for the apparatus of FIGS. 4-5.

The terminal 210 determines in step 801 whether the transmission device 220 for transmitting the MHL signal is connected, and proceeds to step 803 when it is determined that the transmission device 220 is connected. Otherwise, the process loops back repeatedly to perform step 801 until a control signal is received.

In step 803, the terminal 210 determines whether the call continues. At this time, the call continuity refers to a case where a generated existing call continues and a case where a new call is generated. The terminal 210 proceeds to step 809 to start the MHL signal filtering when it is determined in step 803 that the call does not continue, and proceeds to step 805 when it is determined in step 803 that the call continues.

The terminal 210 terminates the MHL signal filtering in step 805 performed by a result of the determination in step 803, which is a determination that the call continues, and then proceeds to step 807. That is, in step 805, the terminal 210 terminates the MHL signal filtering when an existing MHL signal filtering is being performed, and maintains the state when the existing MHL signal filtering is not being performed.

The terminal 210 determines whether the call is terminated in step 807. The terminal 210 proceeds to step 809 when it is determined in step 807 that the call is terminated, and proceeds to step 805 to maintain the MHL signal filtering stop state when it is determined in step 807 that the call is not terminated.

In step 809, the terminal 210 starts the MHL signal filtering, and loops back to step 803.

In the above description, the MHL signal filtering operation performed in the terminal 210 according to the alternative exemplary embodiment of the present invention has been discussed with reference to FIG. 8. Hereinafter, the MHL signal filtering operation performed in the transmission device 220 according to another alternative embodiment of the present invention will be described with reference to FIG. 9.

Figure 9:
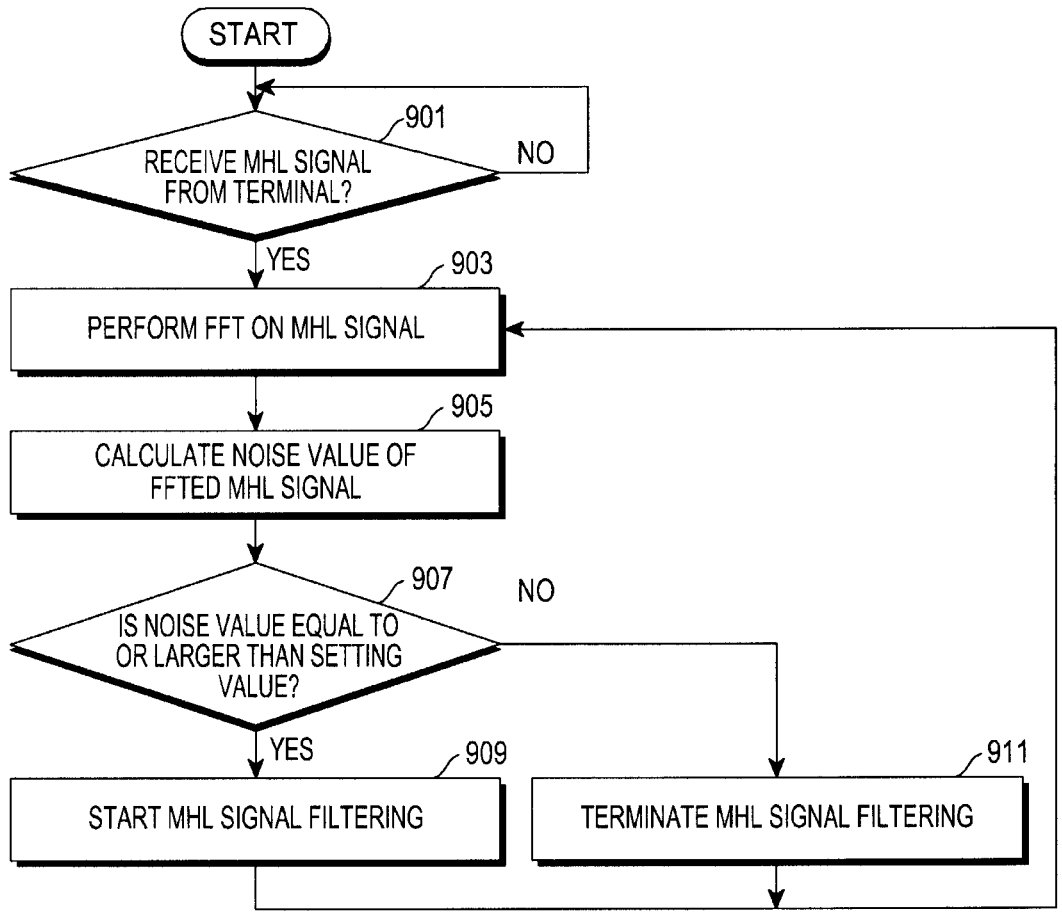
FIG. 9 is a flowchart for describing the MHL signal filtering process in a transmission device according to the alternative exemplary embodiment of the present invention.

FIG. 9 is a flowchart for describing the MHL signal filtering operation performed in the transmission device 220 according to the alternative exemplary embodiment of the present invention shown in FIGS. 4-5. The operations of the transmission device 220 illustrated in FIG. 9 are operations performed in accordance with the operations of the terminal 210 described with reference to FIG. 8.

The transmission device 220 determines whether the MHL signal is received from the terminal in step 901. When it is determined that the MHL signal is received, the transmission device 220 proceeds to step 903. Otherwise, the process loops back repeatedly to perform step 901 until an MHL signal is received.

The transmission device 220 performs the FFT on the received MHL sign in step 903, and then proceeds to step 905.

The transmission device 220 calculates a noise value of the fast Fourier transformed MHL signal in step 905, and then proceeds to step 907.

The transmission device 220 compares the calculated noise value with a predetermined setting value in step 907. When the calculated noise value is equal to or greater than the predetermined setting value, the transmission device 220 proceeds to step 909. Otherwise, the transmission device 220 proceeds to step 911. For example, in step 907, the transmission device 220 compares a power value in a particular bandwidth of the fast Fourier transformed MHL signal, for example, a bandwidth of 700 MHz used in Long Term Evolution (LTE) communication or a bandwidth of 900 MHz used in Global System for Mobile (GSM) communication, with the predetermined setting value, and performs a next operation in steps 909, 911 according to a result of the comparison.

The calculated noise value equal to or greater than the predetermined setting value indicates that the RF weak electric field is formed due to the call generation in the terminal 210 and thus an MHL signal distortion is generated.

When step 909 is performed by a result of the determination in step 907 which is a determination that the calculated noise value is equal to or greater than the predetermined setting value, the transmission device 220 starts the MHL signal filtering in step 909.

Meanwhile, when step 911 is performed by a result of the determination in step 907 which is a determination that the calculated noise value is less than the predetermined setting value, the transmission device 220 terminates the MHL signal filtering in step 911.

After the operations in steps 909 and 911, the transmission device 220 proceeds to step 903 and continuously performs the FFT for calculating the noise value in order to determine whether to perform the MHL signal filtering. The FFT may be performed in every set period having a predetermined and repeated time duration.

In the above description, the MHL signal filtering operations performed in the terminal 210 and the transmission device 220 according to the alternative exemplary embodiments of the present invention have been discussed with reference to FIGS. 8 and 9. Hereinafter, an effect of the MHL signal filtering according to exemplary embodiments of the present invention will be described with reference to associated drawings.

FIG. 10 illustrates an MHL signal filtering effect in a state where the common mode filter 226 is applied to the transmission device 220 according to exemplary embodiments of the present invention.

For implementing the present invention, tests have been performed in frequency bands of Personal Communication Systems (PCS) 1900, GSM 900, and Digital Cellular Service (DCS) 1800 in an electric field area ranging from −65 dBm to −70 dBm and a Transverse Electro Magnetic (TEM) cell. Further, the tests have been performed with impedances of 12, 35, 50, and 90 ohm of the common mode filter applied to the transmission device 220.

As illustrated in FIG. 10, when the common mode filter 226 is not applied, the MHL signal filtering is below the standard. That is, a screen output is not normally performed.

Meanwhile, when impedance of the common mode filter 226 is equal to or greater than 50 ohm, the MHL signal filtering satisfies the standard in all frequency bands. Accordingly, in order to meet the standard in all frequency bands, it is preferable to set an impedance of the common mode filter 226 to a value equal to or greater than 35 ohm. However, when the impedance of the common mode filter 226 is too high, a signal distortion due to the high impedance may be generated, and thus it is preferable to set the impedance of the common mode filter 226 to a value ranging from 35 to 50 ohm.

Figure 11A:
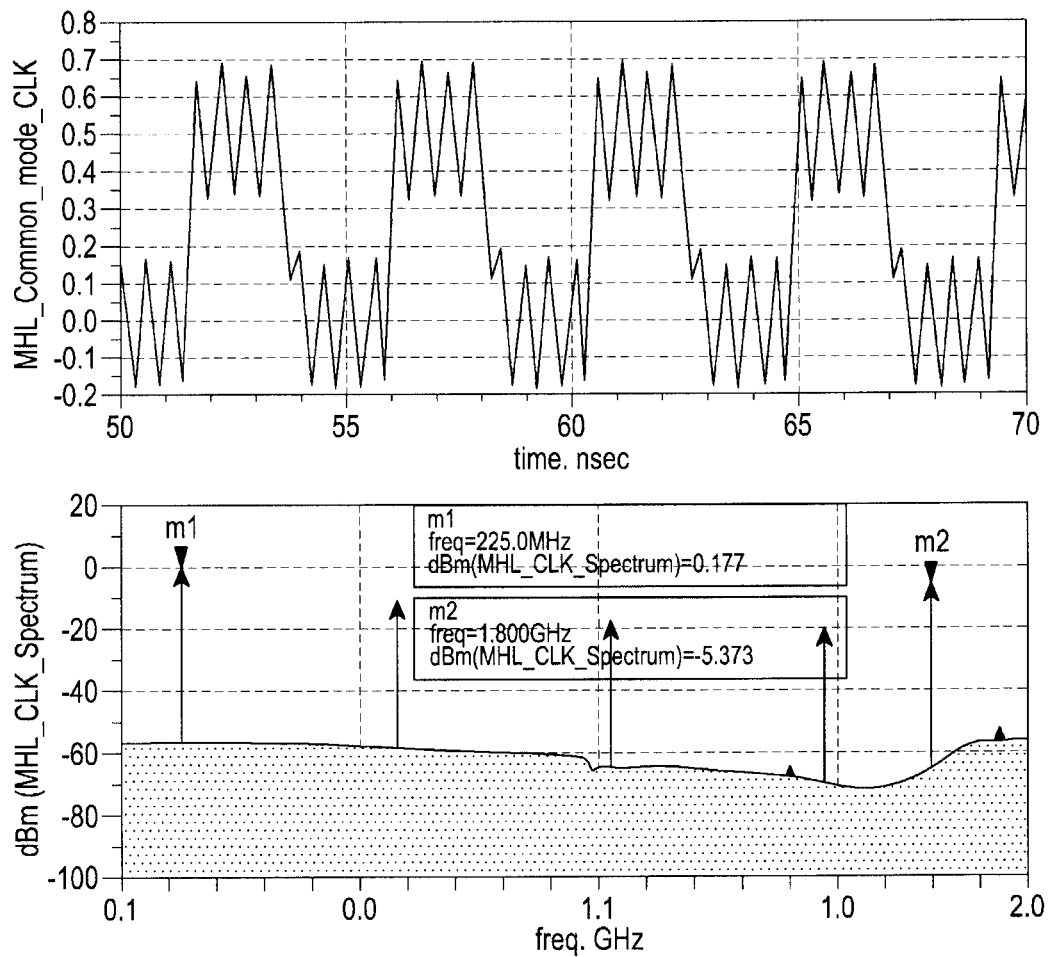
FIGS. 11A and 11B illustrate a signal state improved by applying a common mode filter to a transmission device according to the exemplary embodiments of the present invention.
Figure 11B:
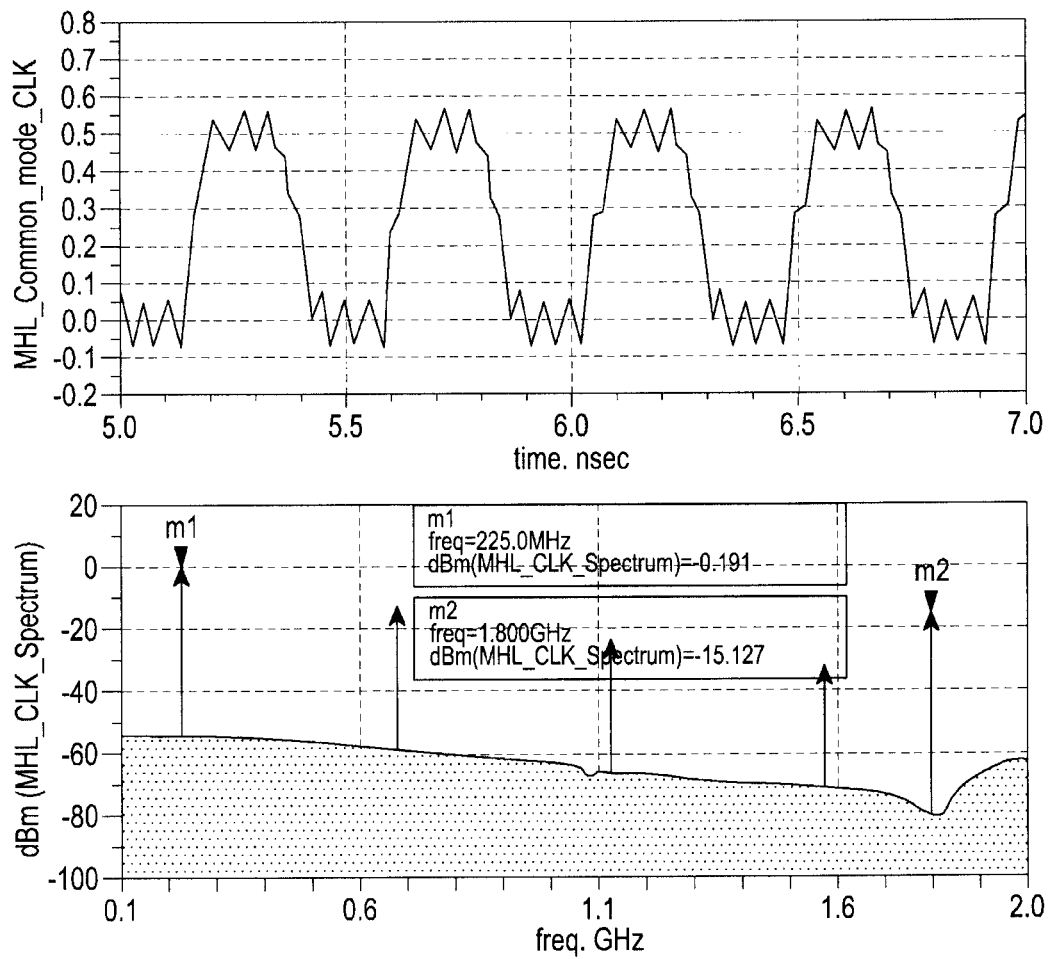

FIGS. 11A and 11B illustrate a signal state improved by applying the common mode filter 226 to the transmission device 220 according to exemplary embodiments of the present invention.

FIGS. 11A and 11B show a test result performed in a weak electric field environment of 33 dBm, FIG. 11A shows a test result according to the filtering method in the prior art, and FIG. 11B shows a test result according to the filtering method according to exemplary embodiments of the present invention.

Referring to FIG. 11A, the MHL_CLK spectrum in a frequency band of 225 MHz in the prior art corresponds to 0.177 dBm. Referring to FIG. 11B, the MHL_CLK spectrum in the same frequency band of 225 MHz for the present invention corresponds to −0.191 dBm. Accordingly, an effect has been improved by the present invention in comparison with the filtering method in the prior art.

Further, referring to FIG. 11A, the MHL_CLK spectrum in a frequency band of 1.8 GHz in the prior art corresponds to −5.373 dBm. Referring to FIG. 11B, MHL_CLK spectrum in the same frequency band of 1.8 GHz in the present invention corresponds to −15.127 dBm, which indicates that an effect has been improved in comparison with the filtering method in the prior art.

The above described exemplary embodiments of the present invention may be implemented in various methods. For example, the exemplary embodiments of the present invention may be implemented using hardware, software, or a combination thereof. When the exemplary embodiments of the present invention are implemented using software, the software may be executed on one or more processors using various operating systems or platforms. Additionally, the software may be configured using any of a plurality of appropriate programming languages, and may be compiled using a framework, an executable machine language executed in a virtual machine, or an intermediate code.

Further, when the exemplary embodiments of the present invention are executed on one or more processors, the exemplary embodiments may be implemented by a processor readable medium (for example, a memory, a floppy disk, a hard disk, a compact disk, an optical disk, a magnetic disk or the like) recording one or more programs to perform a method of implementing various exemplary embodiments of the present invention.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

Although the detailed exemplary embodiments of the present invention have been discussed in the description of the present invention, various modifications can be made without departing from the scope of the present invention. Therefore, the present invention is not limited to the above-described exemplary embodiments but defined by the appended claims and the equivalents thereof.

What is claimed is:

1. A method of performing Mobile High-definition Link (MHL) signal filtering in a terminal, the method comprising:
   determining whether a transmission device for MHL signal transmission is connected to the terminal;
   determining whether a call continues when the transmission device is connected;
   determining whether to perform the MHL signal filtering in the terminal based on whether the call continues; and
   generating a control signal for instructing the transmission device to perform the MHL signal filtering and transmitting the control signal to the transmission device.

2. The method of claim 1, further comprising not performing the MHL signal filtering in the terminal while the call continues.

3. The method of claim 1, further comprising performing the MHL signal filtering in the terminal when the call does not continue.

4. An apparatus for performing Mobile High-definition Link (MHL) signal filtering in a terminal, the apparatus comprising:
   a connection port connectable with a transmission device for MHL signal transmission; and
   a controller for determining whether a call continues when the transmission device is connected to the terminal, and determining whether to perform the MHL signal filtering of an MHL signal in the terminal based on whether call continues,
   wherein the controller generates a control signal for instructing the transmission device to perform the MHL signal filtering and transmits the control signal to the transmission device.

5. The apparatus of claim 4, wherein the controller does not perform the MHL signal filtering in the terminal while the call continues.

6. The apparatus of claim 4, wherein the controller determines not to perform the MHL signal filtering in the terminal when the call does not continue.

* * * * *